US006334179B1

(12) United States Patent
Curran et al.

(10) Patent No.: US 6,334,179 B1
(45) Date of Patent: Dec. 25, 2001

(54) DSP COPROCESSOR HAVING CONTROL FLAGS MAPPED TO A DUAL PORT SECTION OF MEMORY FOR COMMUNICATING WITH THE HOST

(75) Inventors: Philip Curran; Brian Murray; Paul Costigan; Mark Dunn, all of Dublin (IE)

(73) Assignee: Masaana Research Limited, Dublin (IE)

( * ) Notice: Subject to any disclaimer, the term of this patent is extended or adjusted under 35 U.S.C. 154(b) by 0 days.

(21) Appl. No.: 09/237,829

(22) Filed: Jan. 27, 1999

(30) Foreign Application Priority Data

Sep. 23, 1998 (IE) ........................................ 98 0783
Sep. 23, 1998 (IE) ........................................ 98 0786
Sep. 23, 1998 (IE) ........................................ 98 0785

(51) Int. Cl.[7] .................................................. G06F 15/16
(52) U.S. Cl. ........................ 712/34; 712/35; 712/31; 712/220
(58) Field of Search ....................... 712/16, 34, 35, 712/220, 10, 11, 18, 19, 28, 30, 31, 32

(56) References Cited

U.S. PATENT DOCUMENTS 4,633,390 * 12/1986 Yoshida ................. 712/211
4,785,393 * 11/1988 Chu et al. ............... 712/221
5,630,153 * 5/1997 Intrater et al. ........... 712/35
5,752,068 * 5/1998 Gilbert .................... 712/16
5,752,071 * 5/1998 Tubbs et al. ............. 712/34
5,784,602 * 7/1998 Glass et al. .............. 712/220

FOREIGN PATENT DOCUMENTS 0299075  1/1989  (EP).
0843254  5/1998  (EP).
0936540  8/1999  (EP).

OTHER PUBLICATIONS

Patent Abstracts of Japan, vol. 6, No. 229, Nov. 16, 1982 and JP 57 130147 A (Tokyo Shibaura Denki KK), Aug. 12, 1982.

* cited by examiner

*Primary Examiner*—Meng-Al T. An
*Assistant Examiner*—Wen-Tai Lin
(74) *Attorney, Agent, or Firm*—Jacobson Holman, PLLC

(57) ABSTRACT

A DSP coprocessor 2 is connected to a host sub-system (3). The host sub-system (3) has a host processor (4), a host RAM (5), and shared RAM banks (6, 7). Multiplexers (11) provide access for either the DSP or the host to a shared RAM bank. Macro commands for functions of the DSP coprocessor are retrieved from the shared RAM banks. This allows comprehensive interaction of the host and the DSP coprocessor.

18 Claims, 6 Drawing Sheets

FIG. 5

| Cycle | Fetch-Decode | Execution | Comment |
|---|---|---|---|
| 0 | F1 (ROM) | - | |
| 1 | F2(ROM) | E1 | |
| 2 | F3(ROM) | E2 | |
| 3 | F4(ROM) | E3 | |
| 4 | - | E4 | |
| 5 | F5(RAM) | - | |
| 6 | - | E5 | |
| 7 | F6(RAM) | - | Execution doesn't use RAM |
| 8 | F7(RAM) | E6 | |
| 9 | - | E7 | |
| 10 | F8(RAM) | - | |
| 11 | F9(ROM) | E8 | |
| 12 | F10(ROM) | E9 | |
| 13 | F11(ROM) | E10 | |
| 14 | F12(ROM) | E11 | |

FIG. 6

| Move Immediate | M1 | 11-bit Immediate | | | | | | | | | | |
|---|---|---|---|---|---|---|---|---|---|---|---|---|
| | 1 | 10 | 9 | 8 | 7 | 6 | 5 | 4 | 3 | 2 | 1 | 0 |

| | | | Data Register | | | 11-bit Immediate | | | | | | |
|---|---|---|---|---|---|---|---|---|---|---|---|---|
| | | | Reg_3 | Reg_2 | Reg_1 | Reg_0 | | | | | | |

| JMP/JSR | | | Condition Code | | | 11-bit Address | | | | | | |
|---|---|---|---|---|---|---|---|---|---|---|---|---|
| | 0 | 1 | Cnd_2 | Cnd_1 | Cnd_0 | 10 | 9 | 8 | 7 | 6 | 5 | 4 | 3 | 2 | 1 | 0 |

| Move Indirect | | | Move Indirect | R/W | | Address Register | | | Data Register | | | | 5-bit constant | | | | |
|---|---|---|---|---|---|---|---|---|---|---|---|---|---|---|---|---|---|
| | 0 | 0 | 1 | R/W | | AR_2 | AR_1 | AR_0 | Reg_3 | Reg_2 | Reg_1 | Reg_0 | 4 | 3 | 2 | 1 | 0 |

| Move Direct | | | Move Direct | | | | R/W | | 7-bit Address | | | | | | | |
|---|---|---|---|---|---|---|---|---|---|---|---|---|---|---|---|---|
| | 0 | 0 | 0 | 1 | | | R/W | | 6 | 5 | 4 | 3 | 2 | 1 | 0 |

| | | | | | | Data Register | | | | | | |
|---|---|---|---|---|---|---|---|---|---|---|---|---|
| | | | | | | Reg_3 | Reg_2 | Reg_1 | Reg_0 | | | |

| ALU | | | ALU | | | ALU Operation | | | | | Data Register | | Address Register | | 3-bit constant | | |
|---|---|---|---|---|---|---|---|---|---|---|---|---|---|---|---|---|---|
| | 0 | 0 | 0 | 0 | | Alu_4 | Alu_3 | Alu_2 | Alu_1 | Alu_0 | Reg_1 | Reg_0 | AR_1 | AR_0 | 2 | 1 | 0 |

| ALU + Indirect | | | | | | | | | | | | | | | | | |
|---|---|---|---|---|---|---|---|---|---|---|---|---|---|---|---|---|---|
| | 0 | 0 | 0 | 0 | | | | | | | | | | | | | |

DSP COPROCESSOR HAVING CONTROL FLAGS MAPPED TO A DUAL PORT SECTION OF MEMORY FOR COMMUNICATING WITH THE HOST

FIELD OF THE INVENTION

The invention relates to DSP systems, and more particularly to the manner in which DSP coprocessors are utilised.

DSP coprocessors allow performance of a number of different operations within a single clock cycle. These operations typically include multiplication and accumulation, one or more data memory reads or writes, and incrementing address pointer registers. Typical applications are control of AC or DC motors, speech processing, vehicle engine knock detection, modems, frequency analysis circuits, and data communication equipment generally.

While DSPs are very efficient for the specific tasks involved, they generally suffer from the problem of requiring a large degree of hand-optimised assembly language to achieve desired performance. This has arisen from the complex nature of such processors.

OBJECTS OF THE INVENTION

One object is to provide a DSP coprocessor which operates efficiently, and which may also be controlled in a flexible manner Another object is to minimise size and cost of a DSP system.

SUMMARY OF THE INVENTION

According to the invention, there is provided a DSP coprocessor comprising:

an arithmetic logic unit;

an address generation unit;

a program control unit;

means for addressing memory to retrieve instructions for a function selected from a library of functions; and activation means for receiving an external input macro command to activate a selected function.

The addressing and activation means allow the coprocessor to operate independently after an external circuit or interface has activated a selected function. This provides excellent design and control flexibility.

In one embodiment, the memory storing the library of functions is a non-volatile memory.

In another embodiment, the program control unit comprises the means for addressing the memory storing the library of functions.

In one embodiment, the program control unit comprises the activation means.

In another embodiment, the activation means comprises means for addressing an external memory to retrieve the macro command.

In another embodiment, the external memory comprises a shared random access memory which is accessable by a host processor.

Preferably, the shared random access memory is mapped with a parameters section, and the coprocessor comprises means for reading initialisation instructions from the parameters section.

In one embodiment, the shared access memory is mapped with a parameters section, and the coprocessor comprises means for reading locations for data and results from the parameters section.

In a further embodiment, the non-volatile memory instructions are in very long instruction word (VLIW) format.

In one embodiment, the program control unit comprises means for addressing programmable instructions in the shared random access memory. In the latter embodiment, the shared random access memory preferably has a partitioned section for instructions.

In one embodiment, the program control unit comprises means for addressing programmable instructions in the shared random access memory and means for decoding the instructions.

In another embodiment, program control unit PC values are within pre-determined ranges and the program control unit comprises means for determining the source of the next instruction according to the value of the PC. In the latter embodiment, the coprocessor preferably comprises means for determining the source of a next instruction, and missing a fetch operation in the current cycle if the source of the next instruction is from the programmable instruction section and the current instruction accesses the shared random access memory.

In a further embodiment, the shared random access memory includes a dual port section and busy and bus request flags are mapped to said section, whereby a host may read or write a flag without affecting coprocessor operation.

According to another aspect the invention provides a DSP coprocessor system comprising a DSP coprocessor as described above and a shared random access memory comprising means for allowing host processor access.

According to a further aspect, the invention provides a DSP coprocessor system as described above and further comprising a host processor.

BRIEF DESCRIPTION OF THE DRAWINGS

The invention will be more clearly understood from the following description of some embodiments thereof, given by way of example only with reference to the accompanying drawings, in which:

FIGS. 5 and 6 are tables illustrating operation of the DSP coprocessor.

DESCRIPTION OF THE PREFERRED EMBODIMENTS

Figure 1:
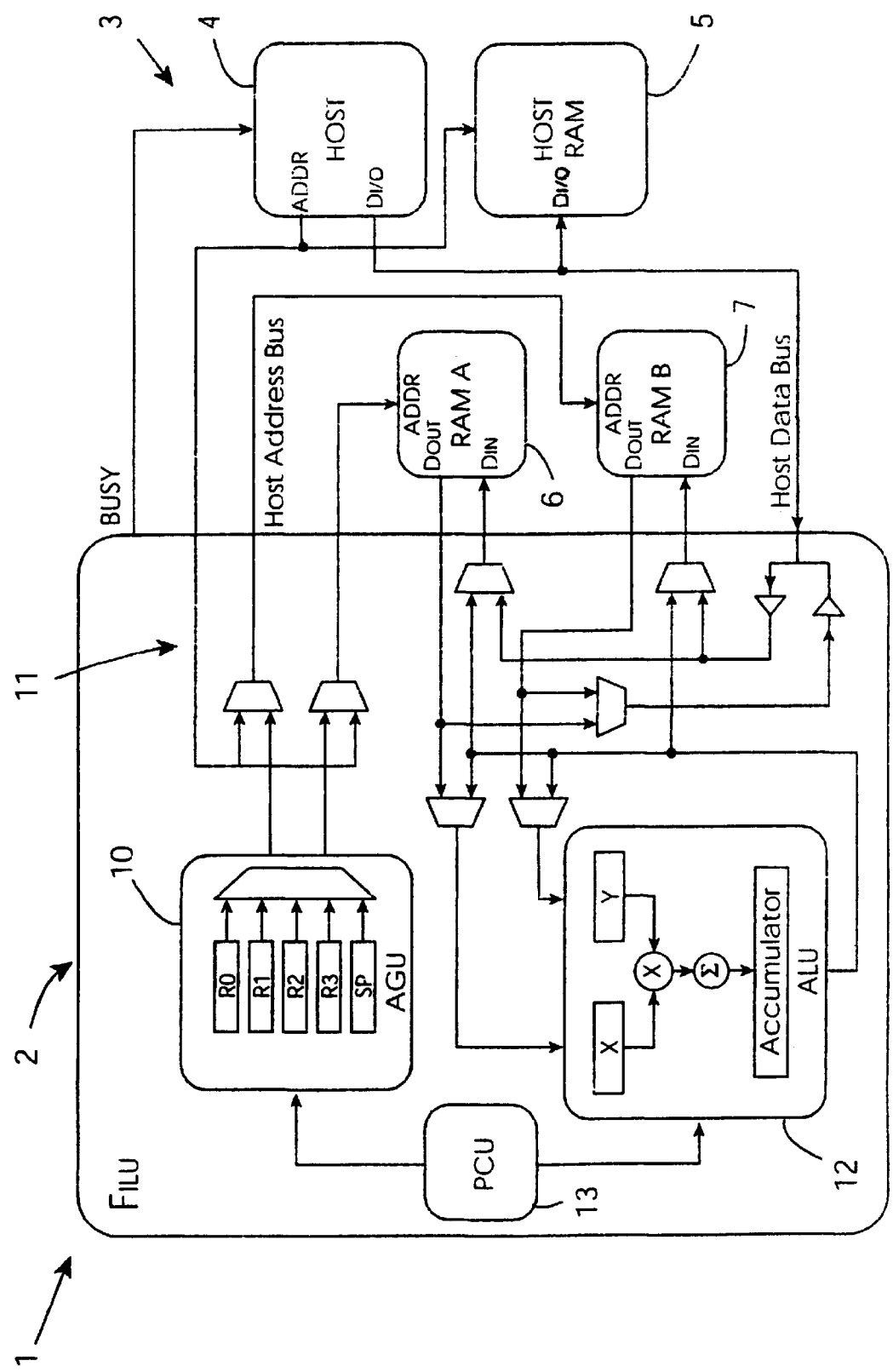
FIG. 1 is a diagram of a DSP coprocessor of the invention and the system in which it is connected.

Referring initially to FIG. 1, there is shown a digital signal processor (DSP) system 1 comprising a DSP coprocessor 2 and a host sub-system 3. The host sub-system 3 comprises a host processor 4, a host RAM 5, and shared RAM banks 6 and 7. Within the DSP 2, there is an address generation unit (AGU) 10, a bank of multiplexers 11, an arithmetic logic unit (ALU) 12, and a program control unit (PCU) 13. The interconnections of the multiplexers 11 is based on the architecture of each multiplexer having either DSP and host data inputs or DSP and host address inputs, and an output to a RAM bank 6 or 7. They provide access either for the DSP or the host to the RAM 6 or 7. The DSP architecture allows provision of one, two or any desired number of ALUs in a modular manner.

The DSP coprocessor 2 operates at 100 MIPs. It has a 16 bit architecture, with a 40 bit accumulator. Its size is very much less than that of conventional DSP coprocessors. The dual memory architecture allows single cycle multiply and accumulate. The DSP coprocessor implements various DSP functions which are microcoded and are invoked by the host processor 4. In essence, the DSP coprocessor acts as a slave under the instructions of the host 4

The microcoded kernel includes FIR and IIR filters, FFT, correlation, matrix multiply, and Taylor series functions. Additional DSP functions may be microcoded. However, an important aspect of the DSP coprocessor is that a comprehensive set of additional functions may be coded by the user into RAM. Such functions may be coded in the C language using an API to invoke the DSP coprocessor functions. C and Verilog models are provided to allow system simulation.

The DSP coprocessor of the invention achieves a very high performance for a small silicon area. One reason is that it includes only the minimum circuits required.

The RAM banks 6 and 7 are mapped with sections as follows:
 parameters,
 RAM data, and
 programmed instructions.

The host writes instructions and data to the relevant RAM bank 6 or 7 to allow the DSP to perform the required functions. For the example of a correlation function of X and Y vectors, the instructions and data are written to the mapped parameters section of the RAM and include the location of the function instructions in other mapped sections of the ROM, the X data location, the Y data location, and the RAM data section location to which the result is to be written. The host then writes the X and Y data to the indicated locations. Subsequently, the host changes the value of a start flag to 1 and this is understood by the DSP as a start trigger. The start flag is located in the mapped RAM instruction section.

Figure 2:
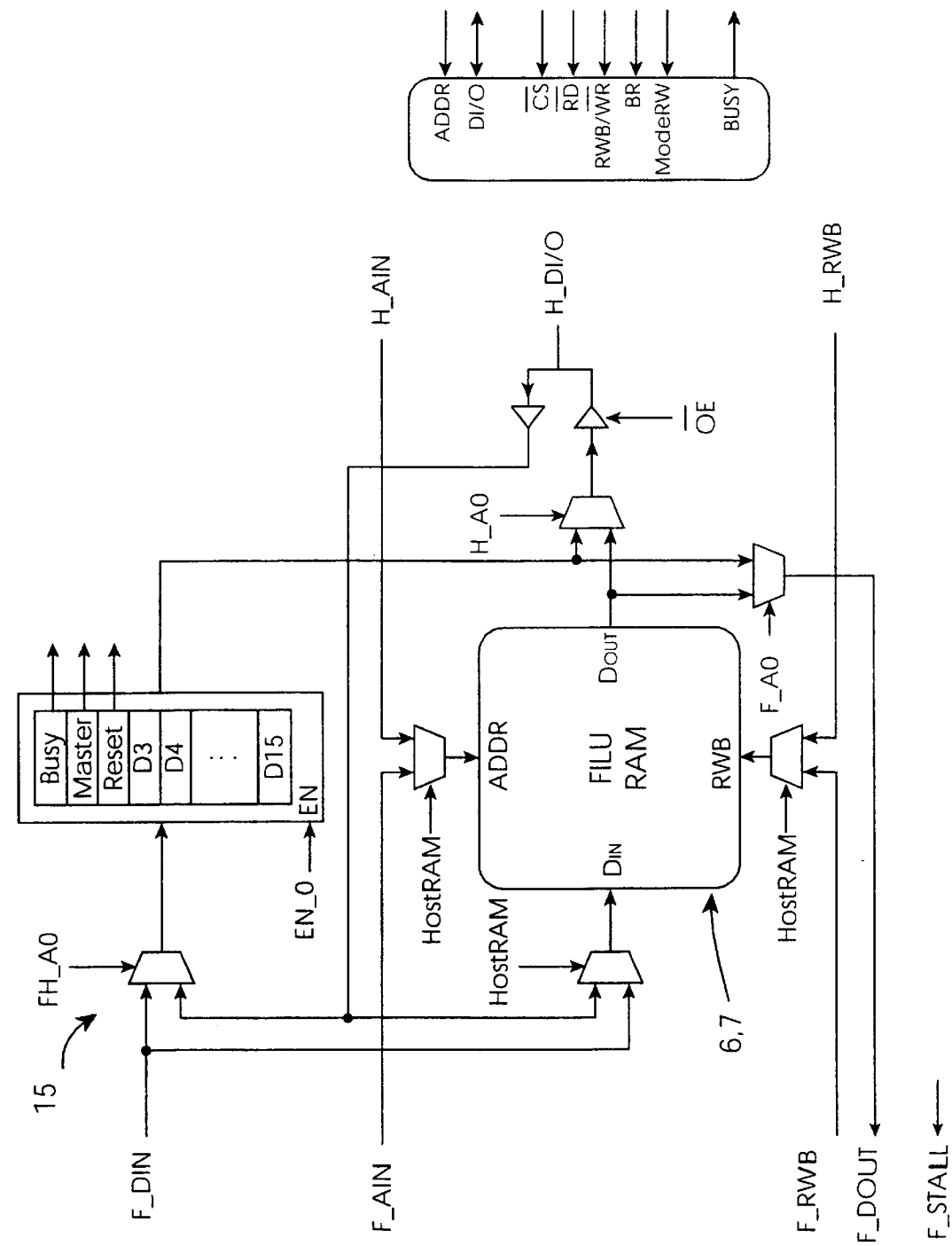
FIG. 2 is a diagram of a coprocessor/host interface.

Referring now to FIG. 2, a host coprocessor interface 15 is illustrated. The interface is via the shared RAM 6 and 7. A control bit MASTER is used to select whether the DSP coprocessor or the host has access to the RAM. A BUSY bit is used to indicate to the host if the DSP coprocessor has finished processing or is still busy. To simplify the interface these bits are memory mapped into location 0 of the RAM. Hence, no additional control lines are needed by the host. This location is implemented with dual port access so that the host can read the busy bit without taking control of the RAM (and stalling the DSP coprocessor).

Both the host or the DSP coprocessor can read or write RAM[0] while the other has control of (and/or is accessing) the rest of the RAM. Also the host of the DSP coprocessor can simultaneously read RAM[0]. If the host and DSP coprocessor try to simultaneously write RAM[O] then the DSP coprocessor must stall. The control bits are tabulated below, in which the DSP coprocessor is named "FILU".

| Bit | FILU | Host | Action |
| --- | --- | --- | --- |
| BUSY = 0 | Read Only | Read/Write | None |
| BUSY = 1 | Read/Write | Read Only | |
| MASTER | Read Only | Read/Write | Control RAM |
| RESET | Read Only | Read/Write | Reset FILU |

The control lines are tabulated below, indicating arbitrates between the host and the DSP coprocessor.

| Line | Condition | Action |
| --- | --- | --- |
| F_A0 | FILU A0→15 = 0 | FILU Read or Write RAM[0] |
| H_A0 | Host A0→15 = 0 | Host Read or Write RAM[0] |
| HostRAM | Master && BR | Controls access to RAM |

| F_A0 | H_A0 | F_RW | H_RW | FStall | EN | FH_A0 | Action |
| --- | --- | --- | --- | --- | --- | --- | --- |
| 0 | 0 | X | X | 0 | 0 | X | No Read or Write |
| 1 | 0 | 0 | X | 0 | 1 | F | FILU Write |
| 1 | 0 | 1 | X | 0 | 0 | X | FILU Read |
| 0 | 1 | X | 0 | 0 | 0 | H | Host Write |
| 0 | 1 | X | 1 | 0 | 1 | X | Host Read |
| 1 | 1 | 1 | 1 | 0 | 0 | X | FILU & Host Read |
| 1 | 1 | 0 | 1 | 0 | 1 | F | FILU Write, Host Read |
| 1 | 1 | 1 | 0 | 0 | 1 | H | FILU Read, Host Write |
| 1 | 1 | 0 | 0 | 1 | 1 | H | FILU Stalled, Host Write. |

The following table sets out the logic for the BUSY bit.

| EN | FH_A0 | Busy | D0 | Busy | Action |
| --- | --- | --- | --- | --- | --- |
| 0 | X | X | X | Busy | No Write |
| 1 | F | 0 | X | 0 | FILU Can't Write to Busy |
| 1 | F | 1 | 0 | 0 | FILU Writes 0 to Busy |
| 1 | F | 1 | 1 | 1 | FILU Writes 1 to Busy |
| 1 | H | 0 | 0 | 0 | Host Writes 0 to Busy |
| 1 | H | 0 | 1 | 1 | Host Writes 1 to Busy |
| 1 | H | 1 | X | 1 | Host Can't Write to Busy |

Usually read/write control is via a single RWB (Read/Writebar) line or two separate lines for fheightRD and fheightWR. A mode line allows either mechanism. The following table sets out the logic for CS and RWB or RD/WR modes.

| Mode | CS | RD | WR | H_RWB | OE | Action |
| --- | --- | --- | --- | --- | --- | --- |
| X | 1 | X | X | 0 | 0 | RAM not selected |
| RWB | 0 | X | 0 | 0 | 0 | Host Write |
| RWB | 0 | X | 1 | 1 | 1 | Host Read |
| RD_WR | 0 | 1 | 0 | 0 | 0 | Host Write |
| RD_WR | 0 | 0 | 1 | 1 | 1 | Host Read |
| RD_WR | 0 | 0 | 0 | 1 | 1 | Shouldn't Happen |
| RD_WR | 0 | 1 | 1 | 1 | 0 | Do Nothing |

An important aspect of the DSP coprocessor is that the host may write a single macro command to the RAM instruction section, and this is interpreted as an instruction to activate one of a selected library of functions such as an FIR filter, a FFT Fourier Transform, or an IIR filter (infinite impulse response filter). For example, the correlation function above is activated by a single macro command. The library of functions is stored in a ROM of the PCU 13.

This aspect of the invention allows very simple and powerful user control using an API. The DSP coprocessor performs the functions very efficiently, while the host-RAM interface allows excellent user control and flexibility. The coprocessor acts as a slave to the host.

The software interface between the host and the DSP coprocessor is in two parts. The first part is a host API which allows the host to control the DSP coprocessor. The API functions are invoked using standard C function calls and they allow the host to:

initialise the DSP coprocessor.
read data from the DSP coprocessor.
write data to the DSP coprocessor.
load function parameters for the DSP coprocessor functions.
call DSP coprocessor functions using C function calls.
poll the DSP coprocessor operating status.

The host API functions are tabulated below.

| Function Name | Description |
| --- | --- |
| ResetFILU | Initialises the DSP coprocessor. |
| StartFILU | Calls a DSP function. |
| ReadFILU | Reads data from the shared RAM |
| WriteFILU | Writes data to the shared RAM |
| CheckFILU Status | Determines the operating status of the DSP coprocessor |
| LoadFILU Parameters | Loads the DSP function parameters into the shared RAM |

The second part of the software interface is a run time library which is the set of DSP functions which can be executed by the DSP coprocessor. These include:

an FIR filter.
a first order IIR filter
a second order IIR filter
an N point in-place FFT, where N is radix 2 number and $N \leq 256$.
a correlation function.
a Taylor series.

These ROM functions are called using C function calls as macro commands. The functions are tabulated below. All of these functions are included in the C-Model. These functions are called by the host using API and executed in the DSP coprocessor.

| Function | Parameter 1 | Parameter 2 | Parameter 3 | Parameter 4 |
| --- | --- | --- | --- | --- |
| FIR | Input Data Address | Data Length | Output Address | Coefficient Start Address |
| IIR_1 | Input Data Address | Data Length | Output Address | Coefficient Start Address |
| IIR_2 | Input Data Address | Data Length | Output Address | Coefficient Start Address |
| CORR | X Address | Y Address | Data Length | Output Address |
| FFT | Real Data Address | Imaginary Data Address | $Log_2 N$ | N |

The DSP coprocessor API is used to pass the function name (effectively a pointer to the DSP coprocessor function) and the list of arguments to the DSP coprocessor. The API function Start FILU is used to call the FIR function as follows:

StartFILU (FILU.FIR, data_in, N, data_out, coefficients);

To call the DSP coprocessor FFT function the function call is:

StartFILU (FILU.FFT, real_data, imaginary_data, number_of_stages, length);

The function StartFILU has a variable parameter list. The first parameter is always a pointer to the function. In the situation where a run time library function is called repeatedly there is no need to reload the parameters every time. The StartFILU function can be a single argument-the function pointer and is called as follows:

StartFILU (FILU.FIR);

In summary, the API function StartFILU can invoke a DSP coprocessor run time library function with a list of function parameters or it can simple pass the function pointer if the parameters are already in place from a previous call.

Many applications will call a number of DSP coprocessor ROM functions in sequence. These ROM function calls can be cascaded into a single function call to the DSP coprocessor. This is a DSP coprocessor RAM function, as the constituent ROM function calls are programmed in the shared RAM. All of the parameters for this RAM function are passed in one go to the DSP coprocessor. The host can poll the DSP coprocessor to determine when the RAM function is complete.

An example RAM function is shown below.
void RAM_function( ) {
  FILU.FIR( );
  FILU.FFT( );
  FILU.CORR( );
Return;
}

In this example the API StartFILU function calls will be as follows:

StartFILU (RAM_function,
FIR_INPUT_DATA_ADDRESS, FIR_DATA_LENGTH, FIR_OUTPUT_ADDRESS,
FFT_COEFFICIENT_ADDRESS, FFT_REAL_DATA_ADDRESS, FFT_IMAGINARY_DATA_ADDRESS
CORR_OUTPUT_ADDRESS);

The general procedure for using a DSP coprocessor ROM or RAM function is:

1. Reset the DSP coprocessor using the API function ResetFILU( ).
2. Load the input data/coefficients into the shared RAM using the API function WriteFILU( ).
3. Call the DSP coprocessor RAM function using the API function StartFILU( ).
4. Continue other host processing in parallel with DSP coprocessor operations.
5. Poll the DSP coprocessor to determine when the function has finished using the API function CheckFILU Status( ).
6. Read the results of the computation using the API function ReadFILU( ).
7. Repeat steps 2 to 6.

The DSP coprocessor can perform a FIR filtering operation on a buffer of data. Where adequate memory is available the entire record may be filtered in one pass. In a single pass filtering operation the programmer need only ensure that the filter memory is zero i.e. for a filter of order p the first p memory locations should be zeroed.

Where a very long record must be filtered and inadequate memory is available the record must be filtered in blocks. The DSP coprocessor automatically adjusts the filter memory on subsequent passes of the filter so that no action is required on the part of the programmer. This example illustrates how the DSP coprocessor can filter a data record of length 5120 in blocks of 512.

In another example, the system is used for knock detection, i.e. the phenomenon where the fuel-air mixture in an internal combustion engine is detonated too soon due to poor quality fuel with catastrophic consequences for the engine. Knock can be detected by an energy detection method. A data stream from an accelerometer mounted on the engine block is filtered using a FIR filter and frequency content determined using an FFT. Finally, the energy content in a number of frequency ranges is determined by a sum-of-squares procedure. The DSP coprocessor is ideally suited to an application like this.

The knock detection algorithm running on the host filters a data stream from an analog-digital (A-D) converter in blocks of length 256, performs an FFT on the filter output and then calculates the sum-of-squares of the FFT output returning a double precision result to the host. This double precision result is used as a knock index. The host maintains the A-D buffer.

The sequences of function calls can be implemented as a RAM function which is implemented as follows.

```
void KnockDetect() {
    filu.FIR();      //call the FIR function
    filu.FFT();      //call the FFT function
    filu.CORR();     //call the Correlation function
    return;
}
```

All the parameters are passed in one go by the API. Hence the Knock detect function is called as follows.
StartFILU (KnockDetect
FIR_DATA_ADDRESS, RECORD_LENGTH, FIR_OUTPUT_ADDRESS, FIR_COEFFICIENT_ADDRESS,
FIR_OUPUT_ADDRESS, FIR_OUTPUT_ADDRESS+256, 8, 256, FIR_OUTPUT_ADDRESS,
FIR_OUTPUT_ADDRESS, 256, CORR_OUTPUT_ADDRESS);

The above pointers have been chosen so that the output of the FIR function provides the input to the FFT function which in turn provides the input to the CORR function.

During execution, the DSP acts independently using the instructions given by the host. The DSP obtains exclusive access to the relevant RAM bank 6 or 7 using the access protocol. The AGU 10 retrieves the first instruction in the mapped section of the RAM bank. This may be a jump-to-subroutine instruction (JSR), which addresses another instruction to be operated. The following is a typical instruction sequence for a correlation example.

```
R0 = *PP++;         // Load X data pointer
R1 = *PP++;         // Load Y data pointer
D0 = *PP++;         // load correlation width
R2 = *PP++;         // load output data pointer
A  = 0L;            // clear A
X  = *R0++;         // load X data point
Y  = *R1++;         // load Y data point
   do {
      A  =  A + X*Y;     multiply - accumulate
      X  =  *R0++;
      Y  =  *R1++;
   }
```

```
while (D0--);
*R2++ = A.A0;       // save LSP
*R2++ = A.A1;       // save MSP
*R2++ = A.A2;       // save XP
return;
}
```

R0, R1, R2, and PP are address registers and * indicates that the address register is used as a pointer. The sequence "//" denotes that what follows is a comment. The sequence "++" indicates an automatic increment when the operation is completed.

"PP" denotes a parameter pointer. "A" denotes the accumulator value. In the first cycle, A stores the accumulation of the product of each X and Y element.

Figure 3:
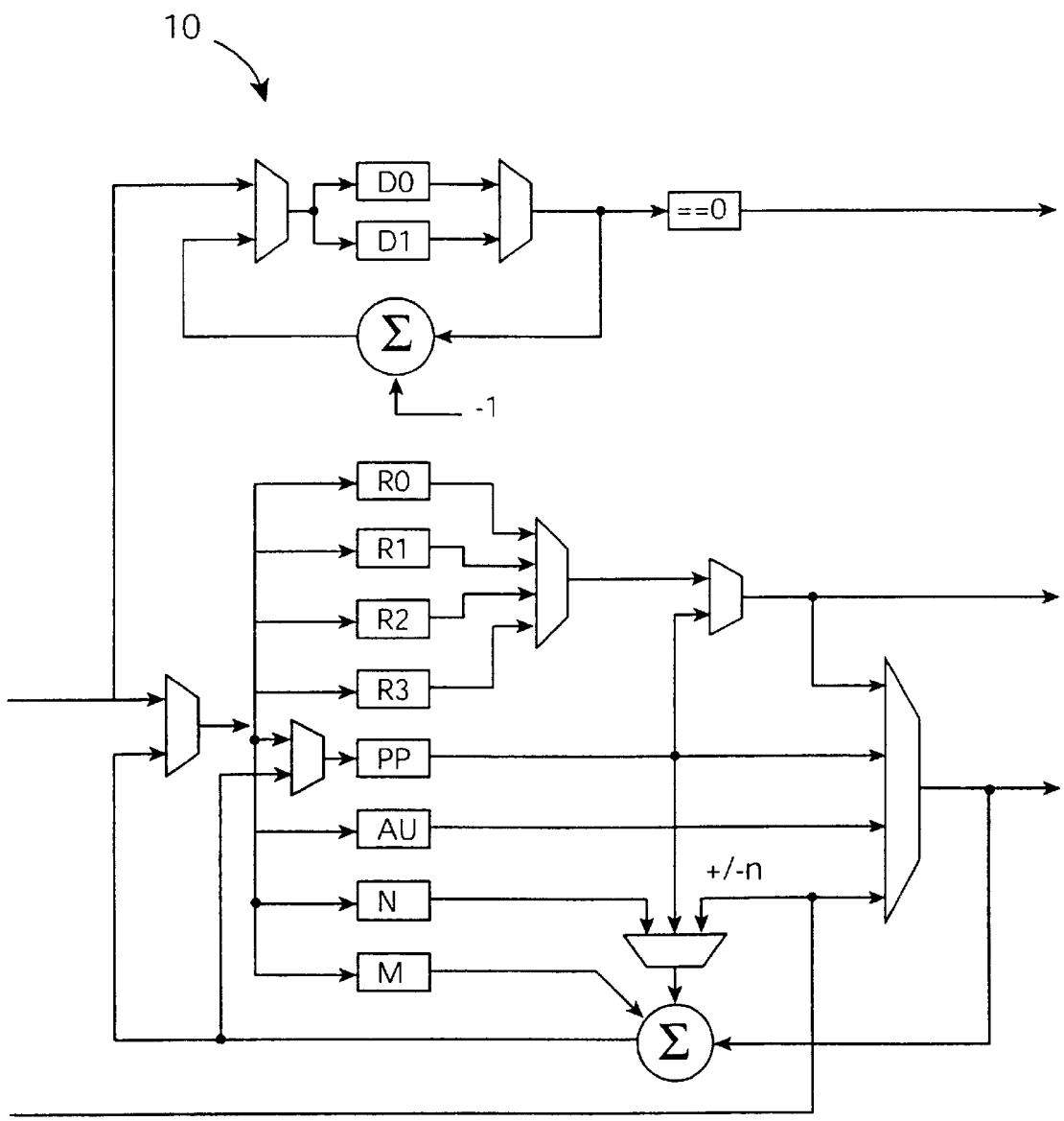
FIG. 3 is a diagram showing an AGU of the DSP coprocessor in more detail.

Referring now to FIG. 3, the structure of the AGU 10 is described in more detail. R0 to R3 are pointers, and control of the multiplexer gives the current address. The selected address is fed back to the summation function. The PCU 13 initially transmits a value n, being the value to add to the fed back address for accumulation. Incrementing the value of PP allows progression through the parameters of the RAM bank 6 or 7. The N register holds the value of n, and allows indexed addressing. The M register allows modular arithmetic. The registers D0 and D1 are counters and are used for looping.

The DSP allows user programmability without Flash memory. This is achieved by adding a sequence of instructions in the RAM mapped section. On the other hand the microcoded instructions are located in the mapped ROM section.

Figure 4:
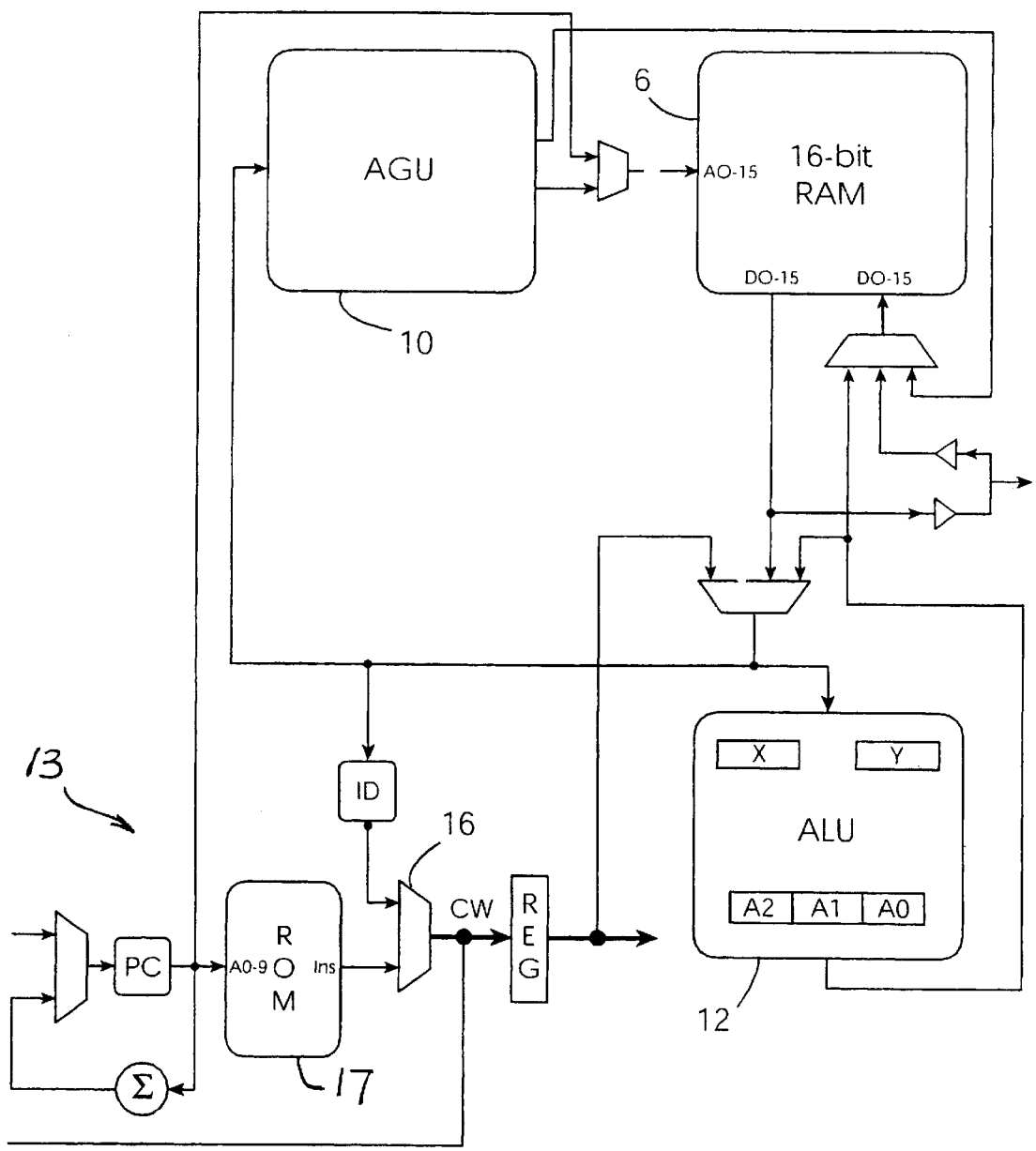
FIG. 4 is a diagram showing the data path architecture.

Referring now to FIG. 4, the data path architecture is illustrated. A multiplexer 16 receives inputs from both a ROM 17 of the PCU 13 and from the RAM 6 and switches between these two. The RAM input is via a decode function ID. The multiplexer is controlled to output the relevant instruction by analysis of the output of the PC. As is clear from this diagram, only the RAM instructions are decoded. There is no need to decode the ROM instructions because they are in the format of very long instruction words (VLIWs). These are 30 to 60 bits wide, and in general are of any width required to achieve simultaneous control of a number of execution units in a single cycle. For example, where there are two ALUs and AGUs, the VLIWs have a width sufficient to control both ALUs and AGUs in parallel. The library of functions is stored in the ROM 17 in VLIW format.

In more detail, the ROM instructions are executed very efficiently for efficient performance of the functions, while the decode circuit ID allows use of user-programmed instructions in the RAM 6 or 7. The ROM instructions are in VLIW format ie. words built up by concatenating several different control words which are wired directly to components such as the AGU, ALU, PCU, and registers to give full control of every unit in every cycle. These instructions are, in a general sense, performed without decoding. By this we mean that the only decoding involved is of a very minor nature for such things as processing a bit in an AGU control word to indicate status of the increment, or a 3-bit flag to indicate which of the five registers is to be updated. On the other hand, the instructions from RAM 6 or 7 are decoded and this is performed by the decode circuit ID. While they are therefore processed less efficiently than the ROM instructions, this is a small price to pay for the versatility provided by the facility to program "after silicon".

Referring now to FIG. 5, the sequence of Fetch-Decode and Execute phases for ROM and RAM instructions are illustrated. The following are important aspects of instruction execution.

As each instruction is fetched from ROM or is decoded from RAM, the VLIW is latched in a VLIW register.

In each cycle, the instruction in the VLIW register is executed.

In parallel, the DSP determines where the next instruction is to come from. This is achieved by monitoring the PC output and comparing it with pre-determined ranges.

If from ROM, the instruction is fetched and written to the register.

If the next instruction is from RAM, and the current instruction accesses RAM for its operation (e.g. a MOVE instruction) then the instruction is not fetched in this cycle, but is delayed to the next cycle. In the next cycle, the instruction is fetched from RAM and decoded.

If the next instruction is from RAM, and the current instruction does not access RAM (eg A=0), then the instruction is fetched from RAM and decoded.

Where the instruction is from RAM, it may be a macro command which activates a coprocessor function with the DSP coprocessor operating in a slave mode to the host.

The above sequence is illustrated in FIG. 5 in which it will be seen that a Fetch is not performed in cycle 4 because the next instruction is from RAM. However, in cycle 8 a Fetch-Decode from RAM is implemented in parallel with an instruction execution because that instruction does not use RAM. This level of control is achieved because the value of the PC output can indicate precisely whether the instruction is from ROM or RAM. This is because the RAM is mapped with pre-defined sections for RAM instructions and for ROM instructions.

This data path architecture is a combined Harvard von Neumann architecture, obtaining the benefits of both approaches. The VLIW instructions are very powerful and provide a high performance, and the RAM instructions allow post-production programmability which allows different applications.

If all of the functions are written to ROM and the sequence of function calls and parameters are in RAM, then the sequence of FIG. 5 is an example of the code near the end of a function (in ROM) followed by an RTS to RAM followed by another JSR (jump to subroutine) to ROM. The expense of an additional cycle when executing from RAM is the same as with the von-Neumann architecture. The cost of the hardware is an additional multiplexer for the RAM address bus between the AGU and the PC and an additional multiplexer for the source of the instruction, between ROM and RAM. This is a very small price to pay for the considerable additional flexability provided by the ability of the user to program in RAM.

One factor which allows a low gate requirement for the DSP is the fact that only a minimum subset of the instruction set must be supported from RAM. Thus, only a very simple decode is required. These are ALU, indirect addressing, and jump instructions. The full instruction set can be divided into four basic types. These are move indirect, move direct (including immediate), ALU, and control.

Also, only three simple addressing modes are supported. These are no increment, post-increment and post-decrement. However, it is envisaged that the DSP may include post-increment by n.

FIG. 6 illustrates an example instruction encoding with 16 bits which allows immediate, move direct, move indirect, ALU and control instructions.

The invention is not limited to the embodiments described but may be varied in construction and detail within the scope of the claims. For example, the DSP coprocessor may receive macro commands other than via shared RAM, such as via a parallel port. Also, the library of functions may be stored in a volatile random access memory which is dynamically loaded.

What is claimed is:

1. A DSP coprocessor comprising:
an arithmetic logic unit;
an address generation unit;
a program control unit;
a memory for storing a library of functions, each said function having a set of instructions;
means for accessing a shared random access memory to which a host processor also has access;
means for reading from said shared random access memory a macro command to activate a stored function selected by the host processor;
means in the program control unit for executing said function without intervention from the host processor, and for writing results of execution of said function to the shared random access memory; and
wherein the shared random access memory includes a dual port section and busy and bus request flags are mapped to said dual port section, whereby a host may read or write a flag without affecting coprocessor operations.

2. The DSP coprocessor as claimed in claim 1, wherein the memory storing the library of functions is a read-only memory of the program control unit.

3. The DSP coprocessor as claimed in claim 1, wherein the shared random access memory is mapped with a parameters section, and the DSP coprocessor comprises means for reading initialisation instructions from the parameters section.

4. The DSP coprocessor as claimed in claim 1, wherein the shared random access memory is mapped with a parameters section, and the DSP coprocessor comprises means for reading locations for data and results from the parameters section.

5. The DSP coprocessor as claimed in claim 1, wherein the read only memory of the program control unit instructions are in very long instruction word (VLIW) having a length in excess of 30 bits format.

6. The DSP coprocessor as claimed in claim 1, wherein the program control unit comprises means for addressing programmable instructions in the shared random access memory.

7. The DSP coprocessor as claimed in claim 1, wherein the shared random access memory has a partitioned section for instructions.

8. The DSP coprocessor as claimed in claim 1, wherein the program control unit comprises means for addressing programmable instructions in the shared random access memory and means for decoding the instructions.

9. The DSP coprocessor as claimed in claim 1, wherein program control unit PC values are within pre-determined ranges and the program control unit comprises means for determining the source of a next instruction according to the value of the PC.

10. The DSP coprocessor as claimed in claim 9, wherein the DSP coprocessor comprises means for determining the source of a next instruction, and missing a fetch operation in the current cycle if the source of the next instruction is from the programmable instruction section of the shared random access memory and the current instruction accesses the shared random access memory.

11. A DSP coprocessor system comprising:

a DSP coprocessor;

an arithmetic logic unit;

an address generation unit;

a program control unit;

a memory for storing a library of functions, each said function having a set of instructions;

means for accessing a shared random access memory to which a host processor also has access;

means for reading from said shared random access memory a macro command to activate a stored function selected by the host processor;

means in the program control unit for executing said function without intervention from the host processor, and for writing results of execution of said function to the shared random access memory, and said shared random access memory having means for allowing host processor access; and wherein the shared random access memory includes a dual port section and busy and bus request flags are mapped to said dual port section, whereby a host may read or write a flag without affecting coprocessor operations.

12. The DSP coprocessor system as claimed in claim 11 further comprising a host processor.

13. A DSP coprocessor comprising:

an arithmetic logic unit;

an address generation unit;

a program control unit including a read only memory storing a library of functions, each said function having a set of instructions;

means in said units for addressing a shared random access memory which is external to the coprocessor and which is shared with a host processor, said addressing means including means for reading instructions for a programmable function from a mapped instruction section of said shared random access memory, means for reading initialization instructions from a parameter mapped section of said shared random access memory, means for reading a macro command from said parameter mapped section, and for using said macro command to identify a function in either the program control unit read only memory or in the instruction section of said shared random access memory, means in the program control unit for executing the identified function without intervention from the host processor and for writing results of execution of said function to said shared random access memory, and wherein the shared random access memory includes a dual port section and busy and bus request flags are mapped to said dual port section, whereby a host may read or write a flag without affecting coprocessor operations.

14. The DSP coprocessor as claimed in claim 13, wherein the macro command reading means includes means for reading identifiers for a plurality of said functions, and the program control unit includes means for executing said functions in sequence.

15. The DSP coprocessor as claimed in claim 13, wherein the program control unit comprises:

means for decoding function instructions which are read from the shared random access memory before executing said instructions, and for directly executing function instructions read from the read only memory without decoding.

16. The DSP coprocessor as claimed in claim 15, wherein the read only memory function instructions are in very long instruction word format having a length in excess of 30 bits.

17. The DSP coprocessor as claimed in claim 15, wherein the program control unit comprises:

means for decoding and executing function instructions read from the shared random access memory by determining the source of a next instruction according to the value of a PC, and determining the source of a next instruction, and missing a fetch operation in a current cycle if the source of the next instruction is the shared random access memory and the current instruction accesses the shared random access memory.

18. The DSP coprocessor as claimed in claim 14, wherein the program control unit comprises:

means for decoding function instructions which are read from the shared random access memory before executing said instructions, and for directly executing function instructions read from the read only memory without decoding.

* * * * *

UNITED STATES PATENT AND TRADEMARK OFFICE
CERTIFICATE OF CORRECTION

PATENT NO.    : 6,334,179 B1
DATED         : December 25, 2001
INVENTOR(S)   : Curran et al.

It is certified that error appears in the above-identified patent and that said Letters Patent is hereby corrected as shown below:

<u>Title page,</u>
Item [73], Assignee, please change "Masaana" to -- Massana --.

Signed and Sealed this

Seventh Day of October, 2003

JAMES E. ROGAN
*Director of the United States Patent and Trademark Office*